(12) United States Patent
Chen

(10) Patent No.: US 7,830,527 B2
(45) Date of Patent: Nov. 9, 2010

(54) MULTIPLE FREQUENCY OPTICAL MIXER AND DEMULTIPLEXER AND APPARATUS FOR REMOTE SENSING

(75) Inventor: Jeffrey R. Chen, Clarksville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 341 days.

(21) Appl. No.: 12/102,240

(22) Filed: Apr. 14, 2008

(65) Prior Publication Data

US 2009/0051926 A1    Feb. 26, 2009

Related U.S. Application Data

(60) Provisional application No. 60/923,618, filed on Apr. 13, 2007, provisional application No. 60/941,156, filed on May 31, 2007.

(51) Int. Cl.
*G01B 11/02* (2006.01)

(52) U.S. Cl. ........................................ 356/489; 356/511

(58) Field of Classification Search ................. 356/489, 356/511
See application file for complete search history.

(56) References Cited

U.S. PATENT DOCUMENTS

| 7,474,407 B2 * | 1/2009 | Gutin | 356/479 |
| 2006/0132790 A1 * | 6/2006 | Gutin | 356/479 |
| 2007/0024956 A1 * | 2/2007 | Coyle | 359/333 |
| 2009/0051926 A1 * | 2/2009 | Chen | 356/511 |

* cited by examiner

*Primary Examiner*—Patrick J Connolly
(74) *Attorney, Agent, or Firm*—Chrisopher O. Edwards

(57) ABSTRACT

A pulsed laser system includes a modulator module configured to provide pulsed electrical signals and a plurality of solid-state seed sources coupled to the modulator module and configured to operate, responsive to the pulsed electrical signals, in a pulse mode. Each of the plurality of solid-state seed sources is tuned to a different frequency channel separated from any adjacent frequency channel by a frequency offset. The pulsed laser system also includes a combiner that combines outputs from each of the solid state seed sources into a single optical path and an optical doubler and demultiplexer coupled to the single optical path and providing each doubled seed frequency on a separate output path.

7 Claims, 3 Drawing Sheets

ı

MULTIPLE FREQUENCY OPTICAL MIXER AND DEMULTIPLEXER AND APPARATUS FOR REMOTE SENSING

RELATED APPLICATION DATA

This application claims the benefit of U.S. Provisional Application Ser. No. 60/923,618, filed on Apr. 13, 2007, and of U.S. Provisional Application Ser. No. 60/941,156, filed on May 31, 2007, under 35 U.S.C. §119(e), the disclosures of which are hereby incorporated herein by reference in their entirety.

ORIGIN OF THE INVENTION

This invention (NASA case no. 15349-1) was developed with funds from the National Aeronautics and Space Administration. The invention described herein was made by an employee of the United States Government and may be used by or for the Government for governmental purposes without payment of any royalties thereon or therefor.

FIELD OF THE DISCLOSURE

This disclosure relates generally to optical mixers and frequency demultiplexers, in particular to frequency doublers for optical sources and apparatus for remote sensing, and more particularly, to techniques for realizing high efficiency, electronically controllable optical sources for coherent radiation.

BACKGROUND

Many remote sensing apparatus rely on transmission of energy towards a surface or terrain to be probed, followed by subsequent reception of energy reflected therefrom, in order to realize maps of terrain, vegetation or surface topography. In many applications, optical sources find utility in this field of endeavor. Vehicles may be used for bearing the remote sensing apparatus and for traversing the area of study. Ground penetrating radar, various types of other radars and remote sensing devices, gravitometers and other kinds of tools have been employed, in conjunction with other types of apparatus and measurement instruments, and have been used in a broad variety of applications for surface and subsurface characterization.

Each of these tools presents advantages in particularized situations, has technological limitations, may require set-up and analysis time, can include risks and also has associated costs. As a result, a cost-benefit analysis that also reflects the particular aspects of interest may favor coordination of multiple instrument types, including optically-based measurement techniques. Of the various types of remote sensing devices, lidars (instruments employing light detection and ranging) find particular utility in broad area mapping employing aircraft or spacecraft as platforms, generally providing data that is integrated with data from other types of guidance, posture-sensing and position-sensing equipment that tracks path, pitch, yaw, velocity and the like associated with the vehicle or platform. Lidar provides high accuracy data by scanning a laser beam in a direction generally transverse to a trajectory of the vehicle, and senses angle from nadir, intensity and the like via analysis of pulses of optical energy reflected from the surface under study.

However, systems used to date as illumination sources for lidars generally employ multiple discrete optical elements which must be assembled and aligned under conditions of extreme cleanliness and where the alignment involves highly precise coordination of the elements forming the system. Additionally, particulate contamination of any of the surfaces between media in such systems tends to give rise to catastrophic failure of the system, and such precisely-aligned optical systems are susceptible to mechanical misalignment due to temperature-induced changes in dimensions of the various elements and/or also due to vibration. These are not trivial concerns, particularly in applications where the unit is not readily field-serviceable following deployment, and/or in environments subject to relatively high vibration amplitudes, high thrust and/or extreme temperature excursions, such as space-based applications.

Further, the types of pulsed illumination sources utilized in these areas of endeavor have typically included open cavity laser systems, which typically have relatively low electro-optical conversion efficiencies and which do not provide much latitude with respect to wavelength $\lambda$ or other characteristics of the output energy. These types of lasers are also susceptible to thermally-induced warpage, and are vulnerable to contamination, as well as unwanted vibration-related effects. For at least these reasons, the utility of lasers previously employed in these types of applications suffers limitations.

Several factors influence imaging performance of systems employing lidar for mapping. For example, relatively low propagation loss of the probe beam through the intervening space is but one of several factors influencing choice of wavelength $\lambda$ for such a system. Another aspect involves the post-return-signal reception processing. In part due to limitations in processor speed, and in part for reasons of discriminating between various return or reflected signals, pulsed laser having repetition rates in a range of up to about ten kiloHertz are preferred for remote imaging deployment.

Many remote sensing systems operate in a range where no more than two optical pulses are provided during an interval starting with pulse transmission and ending with pulse reception, and thus a time difference ("T") between pulses of twice the distance separating the measurement system from the target ("D") multiplied by the velocity of light ("c"), or:

$$(2*D)/c \leq T, \tag{Eq. 1}$$

is determined. As a result, the altitude D above the surface to be mapped often determines a maximum practical repetition rate R for the optical pulses being employed. For example, in a scenario involving orbital ranging for characterizing and mapping planetary surfaces at an altitude D of several hundred kilometers, pulse repetition rates are limited to several hundred pulses per second. At closer ranges, of tens of kilometers or less, repetition rates R may be as much as several thousand pulses per second.

An altimeter lidar can be configured such that it sends out a second pulse within any one frequency channel before receiving a returned signal from a first pulse, effectively multiplying the repetition rate R, or, put another way, cutting the interpulse time T given above in Eq. 1.

However, in many cases, these first and second pulses need to be separated in time so that the reflection of the first pulse off the ground will not be confused with reflection of the second pulse from the top of the cloud. The following example will assume that only one pulse is in flight at any one time, that is, a second pulse will not be initiated until after receipt of the first pulse, which is delayed by traveling to and reflecting from the most distant object the system 100 is intended to survey. Results from such an analysis are easily scalable to other schemata which may utilize various known techniques to achieve higher repetition rates.

Since, for Earth, the highest cloud has an altitude D of about twenty kilometers above the ground, the minimum pulse period T is about 133 microseconds, corresponding to pulse rate R which is less than or equal to about 7.5 kiloHertz (see Eq. 3, infra). In this discussion, the repetition rate R is set by a modulator (described later), and the modulator also determines pulse width. Use of pulse widths of ~one nanosecond results in a high modulation bandwidth, circa one-half GHz.

More rapid modulation rates, such as are used in optical amplifiers for fiber-based information and telecommunication systems, generally require continuously pumped optical sources, and, in turn, the lower repetition rates useful in mapping applications do not favor high pulse rate modulation applied to the optical signal. High repetition rate has been a primary concern with respect to fiber-based optical amplifiers for communications system applications, and that arena has been a focus with respect to development of fiber-based laser amplifiers to date. At the same time, the rate at which present-day lidar equipment can operate, due to cloud detection (aka "cloud folding"), limits practical pulse rates to frequencies less than 7.5 kiloHertz, and which may be as low as 100 Hz.

Solid state laser diodes provide relatively straightforward electro-optical modulation and control capabilities through conventional control of the electrical signals used to drive them. Such laser diodes also provide mechanically robust illumination sources and do not suffer some of the temperature sensitivities and other performance disadvantages that some gas lasers, using open optical cavities, suffer. As semiconductor laser diode sources have become more robust, with increasing power and wavelength $\lambda$ capabilities, the range of applications for which such laser diodes provide attractive characteristics has also increased.

However, these types of diode lasers do not provide sufficient power per pulse to be used for aerial mapping, unless some form of optical amplifier is provided, in order to boost the energy per pulse. In turn, the power levels required, when achieved via conventional optical amplification systems, also present known effects degrading system performance, such as amplified spontaneous emission (ASE), frequency shifting (optical frequency doubling), spontaneous mode-locking, longitudinal mode beating and thermally-induced lensing, among other phenomena. At sustained high operating power densities, melting or other catastrophic failure of the optical fiber or other optical elements tends to limit the useful lifetime of such laser and amplifier systems to roughly a few seconds of operational life.

A significant result of technological innovations in laser diode sources and in optical amplifiers is that the potential and capability for real-time mapping of topography using systems from airborne platforms is enhanced, where the systems have increased immunity to conventional infirmities. As a result, these capabilities represent strong impetus to incorporate new types of optical sources in lidar-based measurement systems adapted for airborne platform deployment.

In addition to lifetime limitations, optical sources for such systems that have been employed in past also have suffered limitations in flexibility and adaptability of parameters affecting operating characteristics of the system as a whole. These parameters may include capability for wavelength diversity, pulse shape, pulse duration and repetition rate, among others. Typically, any in-situ change in any of these parameters also affects the others, thus greatly limiting the adaptability of a lidar instrument a specific application or narrow range of target reflectivity and distance.

For the reasons stated above, and for other reasons discussed below, which will become apparent to those skilled in the art upon reading and understanding the present disclosure, there are needs in the art to provide more robust optical sources in order to increase useful life of laser light sources intended for laser-based metrology and mapping, while also increasing the performance latitude achievable via employment of such light sources.

SUMMARY

The above-mentioned shortcomings, disadvantages and problems are addressed herein, which will be understood by reading and studying the following disclosure.

In one aspect, a system for remote sensing and mapping is disclosed. The system includes one or more processors, and an illumination source controller and modulator coupled to the one or more processors. The system also includes a multiplicity of pulsed illumination sources, each having a different seed frequency within a pre-selected band of frequencies, coupled to the illumination source controller and modulator. The system further includes a signal combining element that couples outputs of all of the multiplicity to a single optical path, and a receiver having a capability for detecting illumination transmitted by the multiplicity of illumination sources and providing signals based on detected illumination. The system additionally includes an image reconstruction engine coupled to the receiver and to the one or more processors. The image reconstruction engine processes signals from the receiver and employs characteristics of the signals to create a mapping corresponding to delay and reflectivity assessments based on the signals. The system yet further is configured so that each pulsed illumination source of the multiplicity comprises: (i) a seed coupled to the illumination source controller and to a modulator, where the seed and modulator accept control and modulation signals from the controller, and (ii) an optical doubler having an input coupled to the single optical path and having an output. Each optical doubler comprises a optical doubling crystal tuned to the seed frequency and a dichroic mirror which splits the doubled seed frequency signal onto a unique output signal path and passes any other seed frequencies to inputs of subsequent optical doublers.

In another aspect, at least two optical doublers each have an operating frequency distinct from the other and are coupled in series. A first optical doubler of the at least two has a first input coupled to a single optical path for carrying multiple optical signals at different frequencies. The first optical doubler includes a first output and comprises a first optical doubling crystal tuned to a first seed frequency to provide a first doubled seed frequency. A first dichroic mirror splits the first doubled seed frequency signal onto a unique output signal path and passes any other seed frequencies to an output port. A second optical doubler of the at least two has a second input coupled to the output port. The second optical doubler comprises a second optical doubling crystal tuned to a second seed frequency to provide a second doubled seed frequency. A second dichroic mirror splits the second doubled seed frequency signal onto a unique output signal path and passes any other seed frequencies through a second output to inputs of any subsequent optical doublers.

In yet another aspect, a pulsed laser system includes a modulator module configured to provide pulsed electrical signals and a plurality of solid-state seed sources coupled to the modulator module and configured to operate, responsive to the pulsed electrical signals, in a pulse mode. Each of the plurality of solid-state seed sources is tuned to a different frequency channel separated from any adjacent frequency channel by at least 250 gigaHertz. The pulsed laser system also includes a combiner that combines outputs from each of the solid state seed sources into a single optical path and an optical doubler and demultiplexer coupled to the single optical path and providing each doubled seed frequency on a separate output path.

Systems and illumination sources of varying scope are described herein. In addition to the aspects and advantages described in this summary, further aspects and advantages will become apparent by reference to the drawings and by reading the detailed description that follows.

DETAILED DESCRIPTION

In the following detailed description, reference is made to the accompanying drawings that form a part hereof, and in which are shown, by way of illustration, specific embodiments which may be practiced. These embodiments are described in sufficient detail to enable those skilled in the art to practice the embodiments, and it is to be understood that other embodiments may be utilized, and that logical, mechanical, electrical and other changes may be made, without departing from the scope of the embodiments. Ranges of parameter values described herein are understood to include all subranges falling therewithin. The following detailed description is, therefore, not to be taken in a limiting sense. It will be appreciated that the terms "wavelength" (λ) and "frequency" (f or f) are used somewhat interchangeably herein, because of the well-known relationship between the two, shown below in Eq. 2:

$$\lambda f = v, \quad \text{(Eq. 2)}$$

where v is the velocity of light or other wave in the medium through which the wave is propagating), and that a frequency band having a particular bandwidth corresponds to a range of wavelengths λ in conformance with the well-known relationship expressed above in Eq. 2.

The detailed description is divided into six sections. In the first section, a system level overview is described. In the second section, an embodiment of seed optical source finding utility in laser ranging and mapping in conjunction with the disclosure of the other sections is presented. In the third section, basic building blocks, their principles of operation and representative performance characteristics are developed. In the fourth and fifth sections, specific implementation examples are described. In the sixth section, a conclusion of the detailed description is provided.

§ I. SYSTEM OVERVIEW

Figure 1:
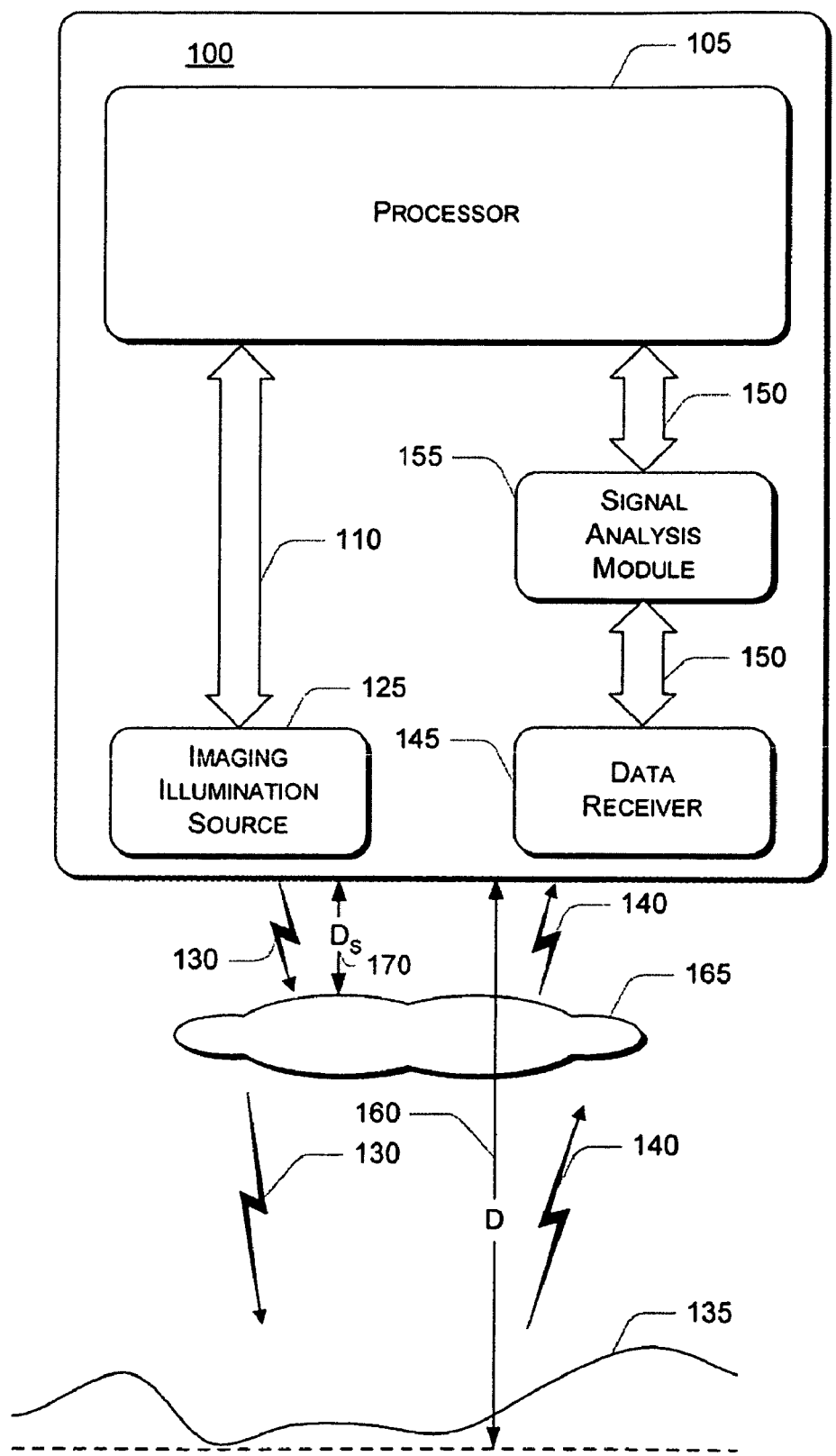
FIG. 1 is a simplified block diagram of an overview of a remote sensing system configured to employ multiple radiated and reflected probe signals, in accordance with the teachings of the present disclosure.

FIG. 1 is a simplified block diagram of an overview of a remote sensing system 100 configured to employ radiated and reflected probe signals. The system 100 includes a processor 105 coupled via a bus 110 to an imaging illumination source 125. One or more probe beams 130, which may be pulses at more than one optical frequency from the imaging illumination source 125, are directed towards a surface 135 to be characterized or mapped, and a reflected pulse 140 is depicted en route from the surface 135 towards a data receiver 145.

The data receiver 145 sorts the return signals 140 by frequency, for example, employing an etalon to achieve a comb filter function, and provides electrical or other signals responsive to the reflected pulse 140 to a bus 150. The interconnection 150 couples signals from the data receiver 145 to a signal analysis module 155, which, in turn, is coupled via the bus 160 to the processor 105, which forms at least a portion of the image analysis or image reconstruction engine 155. In order to produce an image, some form of side-to-side or other optical scanning mechanism is employed, e.g., e.g., two-dimensional scanning of the output signal 130 from the lidar apparatus 100. In one embodiment, repeated passes of the aircraft or spacecraft over or near the target area may be employed to produce laser spot grids and overlapping swathes which may be combined in order to form an image of an area that is larger than is possible to assess with a single pass. It will be appreciated that one or more of the elements shown in FIG. 1 may be implemented as a portion of software and/or hardware comprising the processor 105.

FIG. 1 also illustrates a distance D 160 separating the system 100 from the surface 135 to be mapped, a cloud 165 above that surface 135 and a shortest separation $D_S$ 175 between the system 100 and the nearest objects providing return signals 140 via reflection of a portion of the outgoing wave 130. This is known as cloud folding, and the shortest path $D_S$ in turn sets the shortest time of flight at which the system is able to operate, with a single pulse being transmitted and received prior to a next pulse being transmitted.

In airborne and spaceborne applications for systems 100, the peak expected distance D 160, in turn, often determines a maximum repetition rate R for the pulses 130, 140 at each frequency $f_K$ and/or $2f_K$ of illumination. However, in some practical applications, it is desirable to "push the envelope" and achieve a higher repetition rate, based on specific knowledge of signal paths and the physical characteristics of the scenario in which the system 100 will operate.

For example, in FIG. 1, cloud folding presents the shortest return path. A maximum height at which the tops of any clouds 165 is known a priori. As a result, it is possible to use this knowledge to ensure receiving the signal which has traveled to the surface 135 which is being characterized and which is at the distance D, while avoiding receiving a signal from a subsequent pulse which has traveled a much shorter distance $D_S$.

Eq. 1 can be inverted to determine a practical maximum repetition rate R usable at a particular altitude D 160 for each given frequency $f_K$ and/or $2f_K$, assuming that a first pulse must be received prior to any return signal 140 arising due to the next pulse, and knowing a maximum altitude of interfering signal reflections above the surface 135 being assessed. In this instance, substitution of the quantity $(D-D_S)$ into Eq. 1 allows determination of a higher repetition rate R, using Eq. 3 below:

$$R \leq c/(2*(D-D_S)). \quad \text{(Eq. 3)}$$

The longest distance D for which the system 100 is able to operate may be determined by the laser power level required in order to produce a detectable signal at the receiver 145 for a variety of well-understood reasons, which will not be discussed here. Usage of multiple wavelengths λ which can be independently detected without interference from other wavelengths λ also being used can allow a higher effective repetition rate R. Optical ranging, mapping and lidar systems, such as the system 100, employ light sources 125 providing luminance at wavelengths λ having relatively high transmissivity in media through which the forward 130 and reflected 140 luminance propagates. In some applications, including some airborne or spaceborne planetary mapping systems, a wavelength λ of about one-half micrometer (corresponding to green light) is useful. For example, next-generation, swath-mapping laser altimeters, using single photon ranging, require multiple green laser beams each comprising short pulses (<1.3 nanoseconds) at a low duty cycle of <0.1%. The peak power is high, but the average power is low.

This poses a challenge for some types of optical amplifiers, which are capable of high average powers (~kW) but are limited in peak powers (~10 kW). Prior art multiple beam techniques employed multiple conventional Yb-(Ytterbium)-doped optical fiber amplifiers, commercially available from IPG Photonics Corporation, 50 Old Webster Road, Oxford, Mass. 01540, USA, or using one or more bulk solid-state laser(s) and then splitting each infrared beam into multiple beams. One approach, for example, uses seven 10 Watt Yb-doped optical fiber amplifiers. Yb-doped optical fibers are also commercially available from Nufern, 7 Airport Park Road, East Granby, Conn. 06026; Liekki Corporation of Lohja, Finland and OFS, 2000 Northeast Expressway, Norcross, Ga. 30071. Fiber components are also available via AC Photonics of Santa Clara, Calif.

It will be appreciated by those of ordinary skill in the art that while the discussion in this disclosure is presented in terms of a concrete example, viz., doubling of a band of frequencies near 1064 nanometers to achieve output wavelengths λ which are frequency-doubled to about 532 nanometers, and the discussion in terms of specific components is tailored to that example, the principles being put forth are not limited to that band of frequencies. Additionally, the disclosed concepts find application to other frequency conversion cases and applications.

The disclosed concepts also apply to other optical amplifiers/laser in different fundamental wavelength λ bands. As such, these concepts are not limited to the special case of nonlinearly combining two equal-wavelength λ photons to achieve frequency doubling. Three photons may be similarly combined and suitably filtered to provide a third harmonic, etc., or two different frequencies may be mixed to provide a sum (or difference) frequency. Additionally, optical parametric oscillators (aka "OPO") and optical parametric amplifiers (aka "OPA") may be implemented using the concepts disclosed herein.

The benefits of using seeded Yb-doped fiber infrared optical amplifiers 250 in place of traditional solid-state lasers with or without amplification include: (i) greater than triple the typical wallplug efficiency of traditional solid-state lasers (efficiencies of 20% electrical to optical power conversion are possible); (ii) excellent range resolution, since the pulses can be made to be shorter (<1.3 nanoseconds vs. 5-10 nanoseconds); (iii) ability to achieve multiple wavelength λ channels in a wide (~50 nanometer) bandwidth with good frequency stability; (iv) reduced cost, mass, size and risk, compared to prior design architectures and approaches; (v) single-mode beam pointing stability and high beam quality; (vi) reduced thermal load, due to improved electrical input power to optical output power conversion efficiency; (vii) an alignment-free and contamination-free, and a mechanically and environmentally robust design; and (viii) leveraging the electrocommunications and commercial fiber optic vendor database. These eight benefits, among others, interact synergistically to provide a compact, rugged, efficient pulsed optical source well-suited for integration into lidar apparatus providing superior performance characteristics in comparison to many prior art configurations.

Additionally, ambient sources of radiation at or near the wavelength λ of the luminance 130, 140 employed for imaging or metrology purposes may provide significant interference. For example, solar radiation or reflected solar radiation (e.g., moonlight) may provide a time-varying luminance, resulting in an interfering signal that reduces dynamic range obtainable and hence tends to obscure the reflected luminance 140. As a result, data receivers 145 often include at least one very narrowband optical filter prior to each detector (such as a photodetector) for each frequency $f_N$, in order to reduce the amount of interference from ambient sources. In turn, however, this can lead to problems, particularly when the frequency of the luminance from the imaging illumination source 125 fails to match the passband of the filter associated with the data receiver 145.

Illumination sources 125 employed in past provided very narrow gain-bandwidth characteristics, and hence were not amenable to tuning to provide multifrequency channel diversity, or they employed relatively fixed-frequency stabilizing elements that may include characteristics not amenable to frequency compensation across a band of frequencies when the resultant luminance 130, 140 fails to match the passband characteristics of all of the frequency-diverse channels of the data receiver 145. An illumination source 125 overcoming some of these deficiencies and providing a pulse train of interleaved but non-overlapping optical signals providing frequency diversity is described infra with respect to section two.

§ II. SEED OPTICAL SYSTEM

Figure 2:
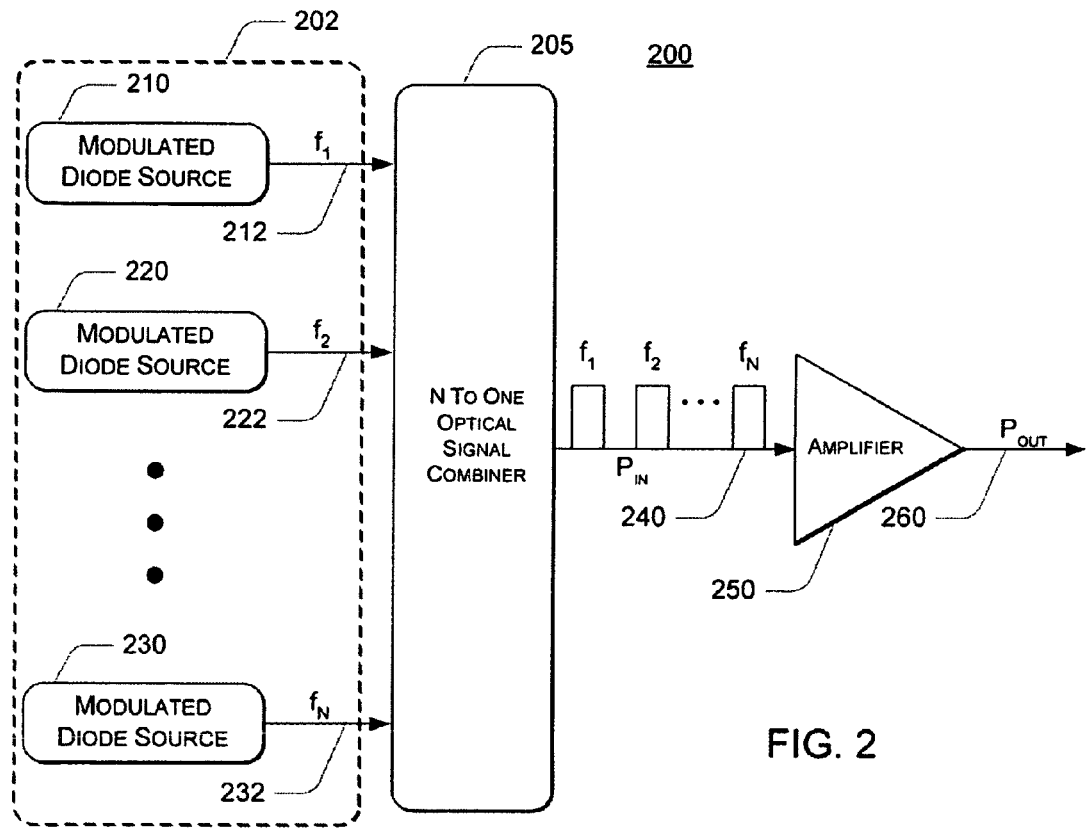
FIG. 2 is a simplified block diagram of a fiber-based amplifier system as a portion of a coherent radiation source useful in the context of the system of FIG. 1, in accordance with the teachings of the present disclosure.

FIG. 2 is a simplified block diagram of a laser system 200 including a group of tuned and modulated seed laser diodes 202, having a set of N many outputs coupled together by an N to one optical signal combiner 205. Such an N to one optical signal combiner 205 may be realized by cascading conventional two-to-one 50% optical fiber couplers. This provides a wavelength-insensitive combiner reduces the power level of each channel by 1/N, plus some added loss on the order of 0.2 dB. This loss occurs at a relatively low power level and can be recovered by a fiber pre-amplifier, available from IPG, without undue loss of efficiency, i.e., using a very modest power budget.

The group of tuned and modulated seed laser diodes 202 includes a first modulated laser seed or source 210 having an output frequency $f_1$ on an output fiber 212, a second modulated laser seed or source 220 having an output frequency $f_2$ (which is different from the output frequency $f_1$) on an output fiber 222, etc., with a final or $N^{TH}$ frequency modulated laser seed or source 230 having an output frequency $f_N$ on an output fiber 232.

Examples of commercial sources for laser seed diodes for the group of individually-tuned laser seed diodes 202 include Lumics of Berlin, Germany; Axel in the United States and Sacher Lasertechnik GmbH, Rudolf Breitscheid Str. 1-5, D-35037 Marburg, Germany. Distributed feedback lasers can be tuned by varying their temperature, for example. Alternatively, the frequency may be set by components outside of the lasing medium.

In one embodiment, the seed sources 210, 220, 230 etc. may comprise laser diodes providing optical energy having a wavelength λ of about one micron, and which is either fixed and stabilized, or electroptically tunable. The laser diodes may be distributed Feed-Back (DFB) laser diodes having a tunable wavelength by changing the current or temperature, or can be laser diodes where each is associated with an external Bragg grating to set its wavelength λ. The Bragg grating can be formed in an optical glass fiber or a bulk glass material to stabilize the wavelength of a laser diode. The Bragg gating can also be formed as a portion of periodically-poled potassium titanyl phosphate (PPKTP) to allow the grating wavelength (hence the wavelength of a seed laser diode) to be electroptically tunable.

Assemblies of suitable diode lasers and electroptically-tunable PPKTP Bragg gratings are a proprietary technology and currently are available from AdvR, Inc., of Bozeman, Mont. These assemblies, in turn, are capable of supporting virtually any wavelength λ of optical energy in a range from at least 970 nanometers to 1080 nanometers, but with any one seed source 210, 220, 230 providing a tunability range of circa ten to twenty nanometers (e.g., plus or minus five nanometers or more) via electronic adjustment of the electroptic gratings. Other semiconductor materials can be specified for these devices, and wavelengths λ ranging from at least 650 nanometers through at least 1650 nanometers are available.

An advantage provided through this electronically adjustable wavelength λ diversity is that the seed source 210, 220, 230 may, in principle, be tuned in situ and in real time to match passband characteristics of the data receiver 145 of FIG. 1. In turn, this provides a degree of flexibility when one or more elements of the system 100 exhibits a change in operating characteristics, or to provide capability for distinguishing between signals from multiple seed sources 210, 220, 230 via use of multiple data receivers 145 each having different passbands.

Often, adjacent output frequencies may be offset by the same frequency separation, such as one nanometer, which corresponds to 265 gigaHertz at a fundamental frequency of about 1064 nanometers (in the infrared). Signals having frequency separations of this magnitude can be efficiently and practically separated from one another, for example at the input to the data receiver 145 of FIG. 1, using commercially-available filters such as those available from Barr Associates, Inc., 2 Lyberty Way, Westford, Mass. 01886 USA, among others.

The N many output fibers 212, 222, . . . , 232 are each coupled to one of the N inputs of the N to one optical signal combiner 205, which provides a series of pulses which are not overlapping in time and which are offset in frequency from adjacent pulses on an output fiber 240. An amplifier 250 is coupled to the output fiber 240 and accepts the combined signals as $P_{IN}$. In one embodiment, the laser seed diodes in the optical seed sources 210, 220, 230 provide a sequential interleaved pattern of non-overlapping optical pulses.

In one embodiment, the laser diodes in the laser seed sources 210, 220, 230 are selected to provide output frequencies near 1064 nanometers, with the pulse lengths being determined either by current modulation or via use of conventional modulation techniques such as intensity modulated Mach-Zehnder fiber pigtail interferometers, under the control of the processor 105 of FIG. 1, to achieve short (<1.3 nanosecond), low duty cycle (<0.1%) pulses from each laser seed diode. Commercial sources for such Mach-Zehnder interferometers include EOspace Inc., 8711 148th AVE NE, Redmond, Wash. 98052-3483, United States and Photline Technologies, 16 rue Jouchoux, 25000 Besancon, France.

It will be appreciated that while the pulses, depicted as rectangular blocks above the fiber 240, are shown in ascending order, any particular order may be used. In other words, adjacent signals may be offset in frequency from one another by a multiple of a standard frequency offset such that N times that offset provides the total bandwidth of the signal being amplified by the amplifier 250. In one embodiment, the amplifier 205 includes a time modulated chopper (for removing interpulse noise) at an input of a preamplifier that provides signals to a power amplifier, and an etalon for providing a comb filter function having passbands at the seed frequencies, or a simple bandpass filter tuned to those frequencies.

The amplifier 250 may be realized as a conventional Yb-doped optical-fiber-based optical amplifier 250 for amplification of relatively high power 1064 nanometer signals. Interleaving the pulses without permitting interpulse or other temporal overlap (as illustrated in FIG. 2) allows them all to be amplified in a single Yb-doped fiber amplifier 260 without suffering undesirable nonlinear effects that limit peak power. It will be appreciated that other, more complex interleaving arrangements, may be possible, where pulses having a relatively wide frequency separation, such that any intermodulation products are weak, and are out of band with respect to desired signals, may permit some temporal overlap, but this discussion is limited to the simple case of non-overlapping pulses for simplicity of illustration and ease of explanation, with the understanding that the broad principles being disclosed may be applied in more complex arrangements by those of appropriate skill in the relevant arts.

The interleaving of wavelength-division-multiplexed pulses does not increase peak power and thus does not add stress to the Yb-doped fiber optical amplifier 250. Conventional components such as an output filter for suppression of amplified stimulated emission effects (aka "ASE" in the relevant arts) and a modulator for chopping out unwanted signals occurring between pulses, both conventionally included after a preamplifier and prior to a power amplifier, are omitted for ease of illustration and clarity of explanation.

The system 200 of FIG. 2 is capable of providing a series of non-overlapping pulses, each comprising a signal having one of a set of frequencies $f_1, f_2, \ldots f_N$, and all of which are collectively amplified via a single amplifier, without incurring unwanted nonlinear effects. These signals can be frequency doubled and demultiplexed using basic building blocks, as described below in section three.

§ III. PRINCIPLES OF OPERATION

Figure 3:
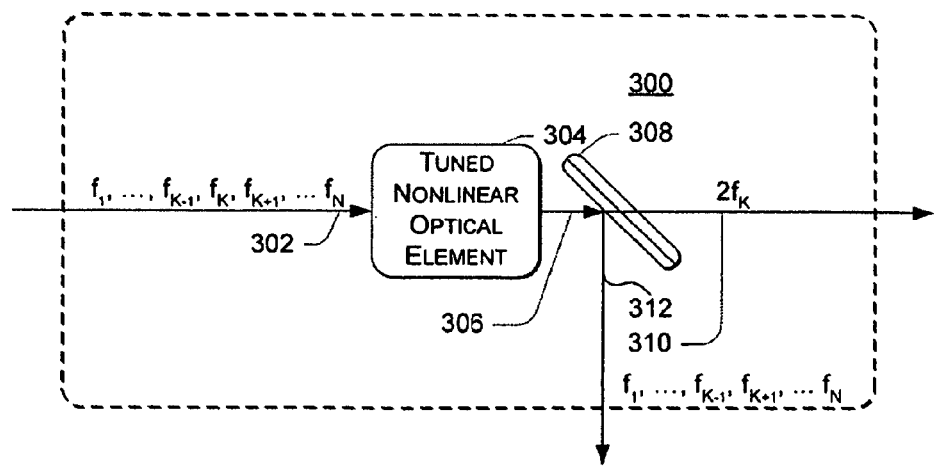
FIG. 3 is a simplified block diagram of a tuned nonlinear optical element which is able to mix photons of a first and second wavelength (which may be the same) to achieve a third wavelength, and to separate that third wavelength from other wavelengths which may be closely spaced vis-a-vis the first and second wavelengths, in accordance with the teachings of the present disclosure.

FIG. 3 is a simplified block diagram of a nonlinear optical cell 300 which is able to mix photons of a first and second frequency or wavelength λ (which first and second frequencies or wavelengths λ may be the same) to achieve photons having a third frequency or wavelength λ, and to largely separate the photons having the third wavelength λ from those photons having the first and second wavelengths λ as well as from any photons having other wavelengths λ which may be closely spaced vis-a-vis the first and second wavelengths λ, in accordance with the teachings of the present disclosure. The nonlinear optical cell 300 has an input 302 which may be coupled to the signal $P_{OUT}$ from the output 260 of the amplifier 250 of FIG. 2 to form part of the imaging illumination source 125 of FIG. 1. In the example illustrated in FIG. 3, the signal at the input 302 is represented as a set of N many signals having frequencies of $f_1, \ldots, f_{K-1}, f_K, f_{K+1}, \ldots, f_N$.

The nonlinear optical cell 300 is configured as an example of a frequency doubler which includes a tuned nonlinear optical element 304 coupled to the input 302 which is tuned to a frequency $f_K$. An example of a tunable or frequency-selective optical doubling crystal is periodically-poled potassium titanyl phosphate (also known as PPKTP), which can be tuned by varying the temperature of the crystal to vary the properties of the grating formed by the periodic poling in a known manner. PPKTP crystals are available from a number of vendors, including Raicol Crystals Ltd., P.O. Box 2753, Yehud, Israel, 56217 (Dr. N. Angert, R&D Manager, tel. 03 9068969). This type of tuned nonlinear element 304 is capable of a relatively narrow bandwidth $\Delta f_{FWHM}$<0.1 nanometer, or 26.5 GHz in the 1064 nanometer band, corresponding to a Q or $\Delta f_{FWHM}/f \approx 10,000$. In turn, this is a very high quality factor Q and thus corresponds to a very narrow bandwidth.

Additionally, this type of tuned nonlinear element 304 can be used to double the frequency $f_K$ to which it is tuned, while providing high transmissivity at other frequencies, a property referred to herein as "frequency orthogonality". The second harmonic generation efficiency η may be approximated as shown below in Eq. (4):

$$\eta(df) \alpha \sin c^2(0.88 df/\Delta f_{FWHM}), \qquad (Eq. 4)$$

where $\sin c(x)=(1/x)\sin(x)$. For channel separations of 0.5 nm (133 GHz>$5\Delta f_{FWHM}$), second harmonic generation efficiency drops to <0.5% of peak efficiency. As a result, 0.5 nanometer constitutes a practical interchannel frequency separation for a multichannel doubler built using multiple tuned nonlinear elements 304 and/or one or multiple nonlinear optical cells 300, as described herein.

In the example illustrated with reference to FIG. 3, the tuned nonlinear optical element 304 has high second harmonic generation efficiency η at the frequency $f_K$, and has relatively high transmissivity with respect to the other frequencies $f_1, \ldots, f_{K-1}, f_{K+1}, \ldots, f_N$ present in the input signal. Transmission losses of 0.2 dB (ca. 5%) are possible for the channels which are not at the center frequency $f_K$ which the tuned nonlinear element 304 is set to.

A residual portion of the signal $f_K$ may be present at an output 306 of the tuned nonlinear element 304, along with a frequency-doubled signal $2f_K$ and signals at other frequencies $f_1, \ldots, f_{K-1}, f_{K+1}, \ldots, f_N$ which are present in the signal at the input 302. A filter such as a dichroic mirror 308 provides high transmissivity at the doubled frequency signal $2f_K$, which is coupled to a path 310, together with high reflectivity for the other signals having frequencies $f_1, \ldots, f_{K-1}, f_{K+1}, \ldots, f_N$ which are coupled to a path 312. Consequently, the frequency doubled signal at $2f_K$ is substantially separated or demultiplexed from the other signals having frequencies $f_1, \ldots, f_{K-1}, f_{K+1}, \ldots, f_N$, and travels along the path 310.

Dichroic filters (mirrors) available from Barr Associates are capable of functioning as the dichroic mirror 308, and providing a reflection loss of <1% for the $2f_K$ frequency signal propagating along the path 310 together with a loss of <5% for the remaining signals having frequencies of $f_1, \ldots, f_{K-1}, f_K, f_{K+1}, \ldots, f_N$ traveling along a path 312. The dichroic mirror/filter 308 transmits the beam having the frequency $2f_K$ which is to be demultiplexed (green beam, 532 nanometers wavelength λ, in this example) but reflects all other wavelengths λ (e.g., the 1064 nanometer wavelength λ beams, viz., those having frequencies having frequencies of $f_1, \ldots, f_{K-1}, f_K, f_{K+1}, \ldots, f_N$) and is configured to avoid cascading higher (transmission) losses. This is particularly true for the demultiplexing bandpass filters 308.

The filter 308 is typically realized as a dichroic mirror. Barr Associates Inc. is a commercial supplier of dichroic mirrors consistent with the parameters noted above. An example of a cascaded doubler and demultiplexer using a series of the basic nonlinear optical cells 300 described in this section is provided below in section four.

§ IV. EXAMPLE A

Figure 4:
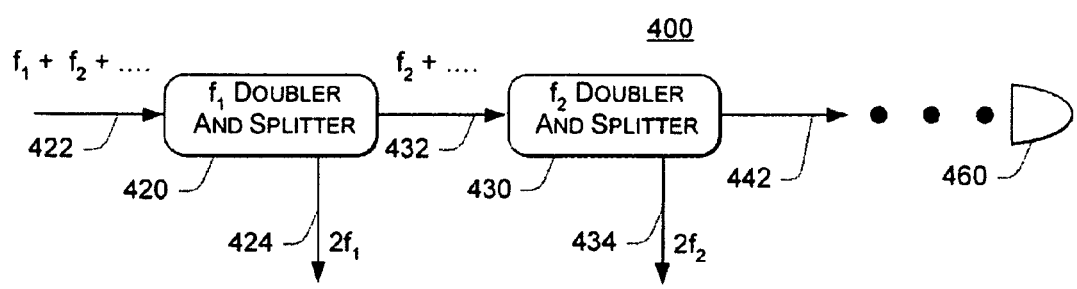
FIG. 4 is a simplified block diagram of a cascaded arrangement of the tuned nonlinear optical elements of FIG. 3, useful as a cascaded second harmonic generator chain which is able to demultiplex different nonlinearly-generated optical frequencies from the fiber-based amplifier system of FIG. 2 into separate signal paths, in accordance with the teachings of the present disclosure.

FIG. 4 is a simplified block diagram of a cascaded arrangement 400 of the nonlinear optical cells 300 of FIG. 3, useful as a cascaded second harmonic generator chain 400 which is able to spatially demultiplex different frequency-doubled optical signals derived from the fundamental frequency signals obtained from the fiber-based amplifier system of FIG. 2 into separate signal paths, in accordance with the teachings of the present disclosure. The embodiment 400 of FIG. 4 includes a first nonlinear optical cell 420 which has an input 422. The exemplary nonlinear optical cell 420 shown in FIG. 4 is analogous to the nonlinear optical cell 300 of FIG. 3, but is illustrated with locations of outputs interchanged vis-a-vis the view of the nonlinear optical cell 300 of FIG. 3.

In other words, the nonlinear optical cell 420 has an output 424 which provides a frequency-doubled version $2f_1$ of a first input signal having a frequency $f_1$ present at input 422 at the frequency to which the second harmonic generation efficiency η is set. The nonlinear optical cell 420 has an output 432 along which any residual of the first input signal at frequency $f_1$ travels, along with a remaining number of input signals having frequencies $f_2+\ldots$.

The embodiment 400 is also depicted as including a second nonlinear optical cell 430 having an input which is coupled to the signal path 432. The second nonlinear optical cell 430 is tuned to a second center frequency $f_2$ for second harmonic generation. The nonlinear optical cell 430 has an output 434 which provides a frequency doubled version of the second signal having a frequency $2f_2$ and a second output 442 which provides the residuals of the first and second frequencies, together with any other signals which will be frequency doubled in successive stages, represented by ellipsis. An optional beam dump 460 may provide a reflection-free termination for the cascaded chain 400 of nonlinear optical elements 420, 430, . . . .

The embodiment 400 thus provides a plurality of frequency-doubled signals, with each stage 420, 430, . . . tuned to a different mixing frequency and each stage including a filter/splitter element (analogous to the dichroic filter 308 of FIG. 3) that is tuned to the sum frequency of the associated tuned nonlinear element (analogous to the tuned nonlinear element 304 of FIG. 3), and splits signals according to frequency, where each of the frequency-doubled signals have been physically demultiplexed so that each frequency-doubled signal is traveling along a different spatial path. A different embodiment which provides the frequency-doubled signals on one signal path for optional subsequent frequency demultiplexing (if desired) is described below in section five with regard to FIG. 5.

§ V. EXAMPLE B

Figure 5:
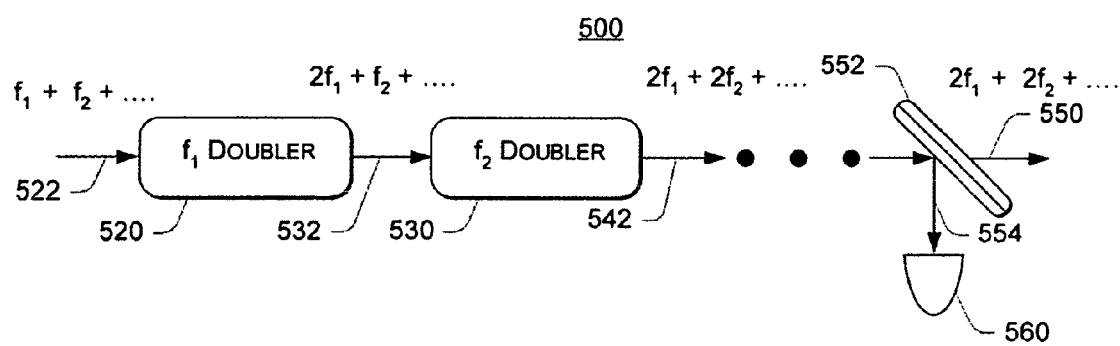
FIG. 5 is a simplified block diagram of a cascaded arrangement of the tuned optical mixing elements of FIG. 3, where, in contrast to the arrangement of FIG. 4, the nonlinearly-generated signals from earlier mixing stages pass through subsequent stages and the band of nonlinearly-generated signals are either allowed to travel collinearly with the fundamental signals or are picked off at one or more points along the chain of tuned optical mixing elements, in accordance with the teachings of the present disclosure.

FIG. 5 is a simplified block diagram of a cascaded arrangement 500 of the tuned optical mixing elements 304 of FIG. 3, in accordance with the teachings of the present disclosure. In contrast to the arrangement of FIG. 4, the nonlinearly-generated signals from earlier mixing stages pass through subsequent stages, and the desired set of nonlinearly-generated signals may optionally be picked off at one or more points along the chain 500 of tuned optical mixing elements 520, 530, . . . .

The frequency doubling system 500 includes the first tuned frequency doubling element 520, tuned to double a first frequency $f_1$, which is coupled to input 522, which provides all of the input signals. The first tuned frequency doubling element 520 passes any residual of the first frequency $f_1$, together with other signals having frequencies $f_2+\ldots$, along a path 532, to the second tuned frequency doubling element 530 that is tuned to double a second frequency $f_2$, and which has an output coupled to a signal path 542. Subsequent stages operate similarly and are represented by ellipsis.

The frequency-doubled signals having frequencies $2f_1+2f_2+\ldots$ are optionally separated from residual fundamental frequency signals $f_1+f_2+\ldots$ and directed along a path 550 by an optional dichroic mirror 552. When the optional dichroic filter 552 is included, the residual fundamental frequency signals are reflected by the dichroic mirror 552 and then travel along a path 554, and can be optionally blocked by a reflection-free termination at a beam dump 560. This configuration finds utility in certain types of lidar apparatus, for example.

The examples of sections four and five each provide configurations of multiple serially-coupled, frequency-orthogonal optical doublers finding utility in various applications and which are well-suited to lidar apparatus for mapping of bodies, such as the Earth, from airborne or space-borne platforms, or moons of the outer planets, e.g., Europa, Enceladus, from space-borne platforms. Each of these embodiments 400 and 500 may be employed with the single-amplifier, multiple seed optical systems 200 (FIG. 2) of section two in order to provide signals formed from non-overlapping pulses of optical energy, where at least some adjacent pulses are separated in frequency, and where the ensemble of pulses span a band of frequencies comprising a plurality of non-overlapping frequency channels, where adjacent channels may be separated from one another by a constant frequency offset, or by a frequency offset which varies.

§ VI. CONCLUSION

An illumination source capable of application in remote sensing, an imaging system based on such an illumination source and a mapping system capable of employing such an illumination source is described. Although specific embodiments have been illustrated and described herein, it will be appreciated by those of ordinary skill in the art that any arrangement which is calculated to achieve the same purpose may be substituted for the specific embodiments shown. This disclosure is intended to cover any adaptations or variations. For example, although described in procedural terms, one of ordinary skill in the art will appreciate that implementations can be made in a procedural design environment or any other design environment that provides the required relationships.

In particular, one of skill in the art will readily appreciate that the names or labels of the elements are not intended to limit embodiments. Furthermore, additional processes and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types. The terminology used in this disclosure is meant to include all alternate technologies which provide the same functionality as described herein.

What is claimed is:

1. A system for remote sensing and mapping comprising:
one or more processors;
an illumination source controller coupled to the one or more processors;
a multiplicity of pulsed illumination sources, each having a different seed frequency within a pre-selected band of frequencies, coupled to the illumination source controller and modulator;
a signal combining element that couples outputs of all of the multiplicity to a single optical path;
a receiver having a capability for detecting illumination transmitted by the multiplicity of illumination sources and providing signals based on detected illumination; and
an image reconstruction engine coupled to the receiver and to the one or more processors, the image reconstruction engine processing signals from the receiver and employing characteristics of the signals to create a mapping corresponding to delay and reflectivity assessments based on the signals;
each pulsed illumination source of the multiplicity comprising:
a seed coupled to the illumination source controller and to a modulator, the seed and modulator accepting control and modulation signals therefrom; and
at least two optical doublers each having an operating frequency distinct from the other and being coupled in series, an input of a first optical doubler of the at least two coupled to the single optical path and having a first output, the first optical doubler comprising a first optical doubling crystal tuned to a first seed frequency to provide a first doubled seed frequency and a first dichroic mirror which splits the first doubled seed frequency signal onto a unique output signal path and passes any other seed frequencies to an input to a second optical doubler of the at least two, the second optical doubler comprising a second optical doubling crystal tuned to a second seed frequency to provide a second doubled seed frequency and a second dichroic mirror which splits the second doubled seed frequency signal onto a unique output signal path and passes any other seed frequencies to inputs of any subsequent optical doublers.

2. The system of claim 1, wherein each seed comprises a laser diode.

3. The system of claim 1, wherein each seed comprises a laser diode coupled to a Mach-Zehnder interferometer.

4. The system of claim 1, wherein each seed comprises a laser diode and provides a pulse-modulated optical output.

5. The system of claim 1, wherein each seed comprises a laser diode coupled to a frequency-tuning element.

6. The system of claim 1, wherein first and second optical doublers comprise periodically poled potassium titanyl phosphate.

7. The system of claim 1, wherein the single optical path includes:

a doped fiber optical amplifier;

a time modulated chopper for removing interpulse noise; and an filter for providing a filter function having a passband at the seed frequencies.

* * * * *